March 14, 1933.   C. H. WHITE ET AL   1,901,684
CULTIVATOR
Filed March 9, 1929   4 Sheets-Sheet 1
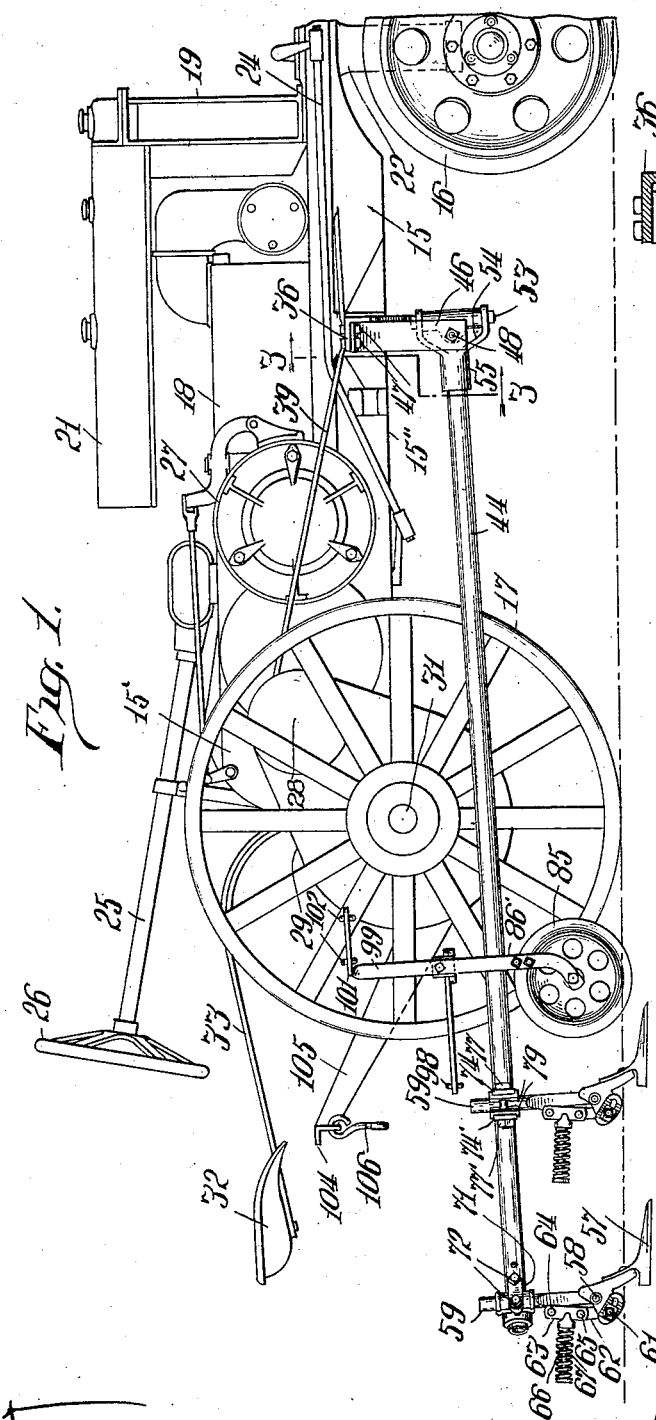
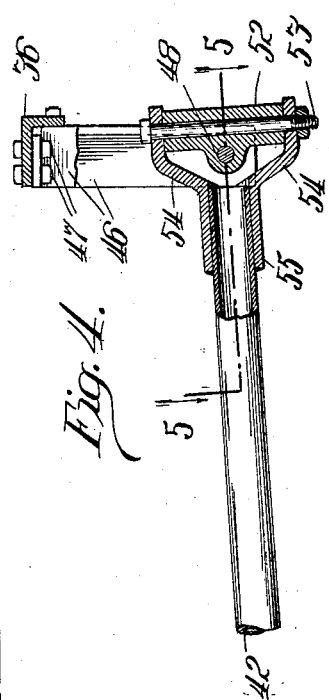
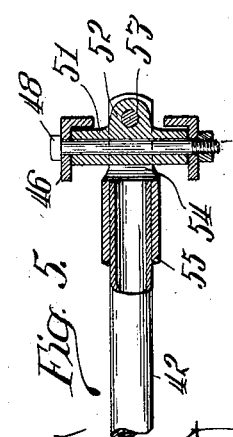
Inventors
Charles H. White
Frank T. Court
By Brown, Jackson, Boettcher & Dienner
Attorneys
Witness
Milton Lenoir

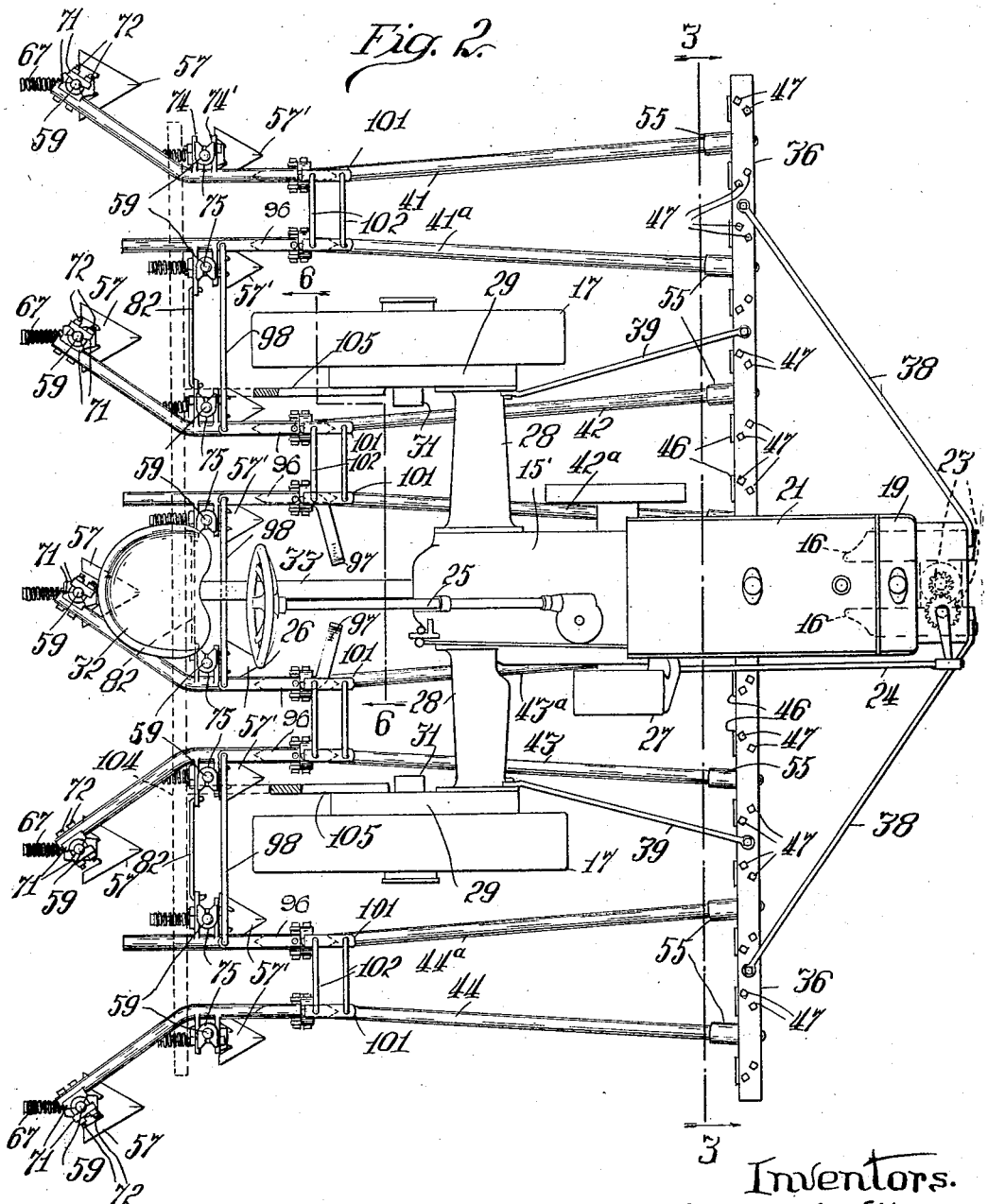

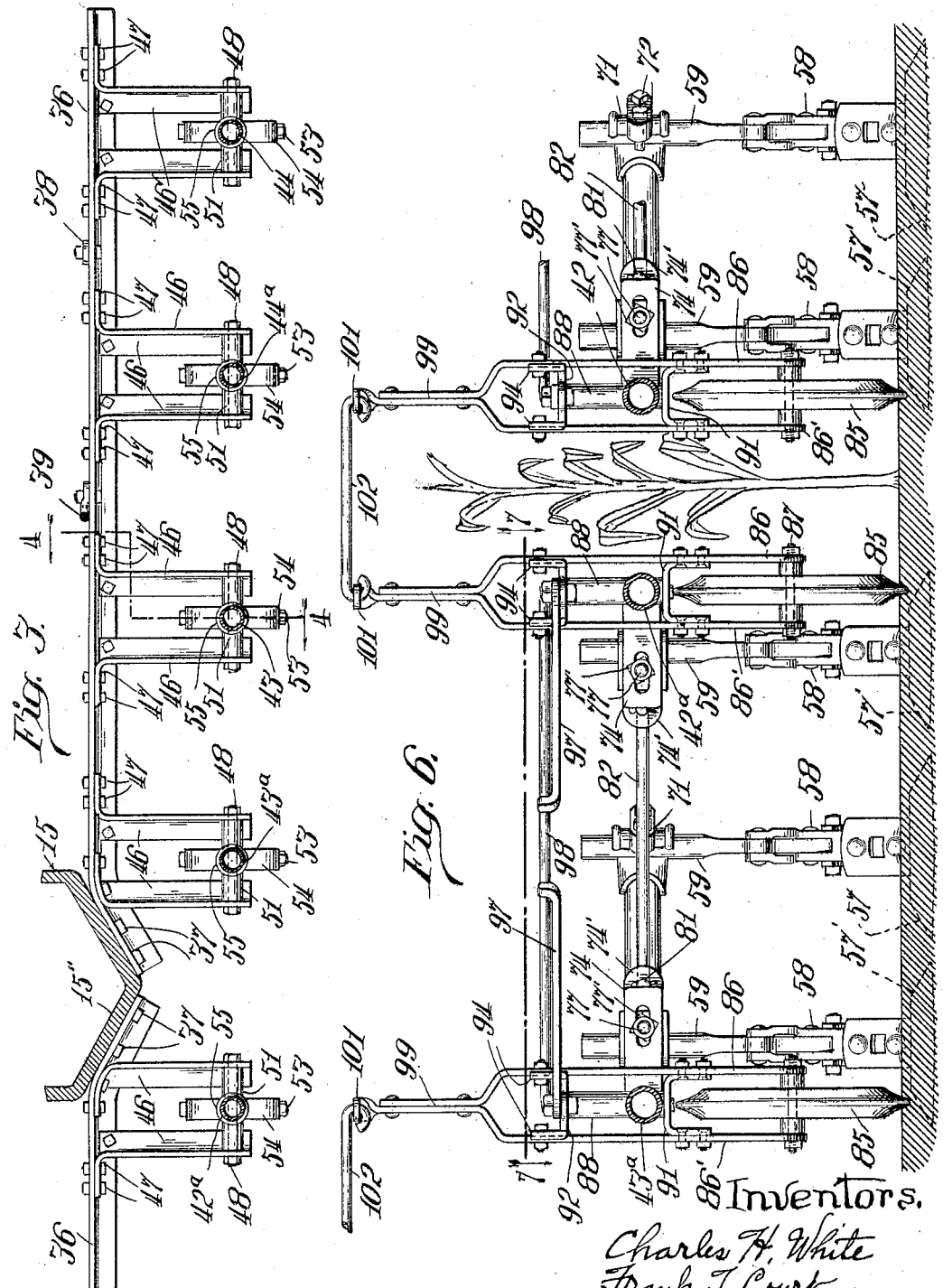

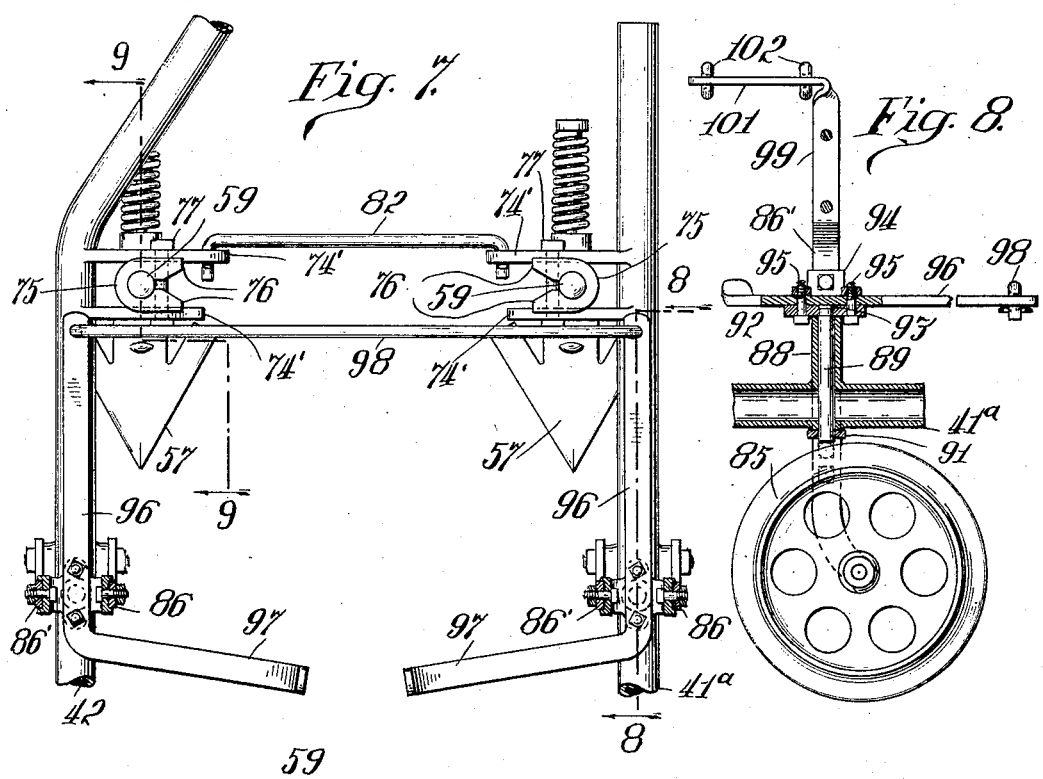

Patented Mar. 14, 1933

1,901,684

UNITED STATES PATENT OFFICE

CHARLES H. WHITE AND FRANK T. COURT, OF MOLINE, ILLINOIS, ASSIGNORS TO DEERE & COMPANY, OF MOLINE, ILLINOIS, A CORPORATION OF ILLINOIS

CULTIVATOR

Application filed March 9, 1929. Serial No. 345,754.

The present invention relates to cultivators, and has particular reference to a cultivating implement adapted for readily attachable and detachable connection with a tractor and in such relation thereto as to permit the operator from his driving position on the tractor to operate or control the cultivating implement.

One of the principal objects of the invention is to provide a cultivating implement of the above type wherein the cultivating shovels or other soil working devices are grouped generally at the rear of the tractor, preferably in back of the position of the rear tractor wheels but in close proximity thereto, and the draft pull on the cultivating devices is had from a hitch point located relatively far forward on the tractor with respect to such cultivating devices, preferably intermediate the front and rear wheels of the tractor. Such construction provides a long flexible draft connection, with the line of draft extending substantially to the center of load of the tractor whereby an easy, steady running of the cultivating rigs is obtained. Moreover, such construction locates all of the rigs where they are directly visible to the operator when facing forwardly in the operation of driving the tractor, so that he can closely observe the alignment between the shovels and the rows without having his attention distracted from the guidance of the tractor.

A further object of the invention is to provide improved means for steering the cultivating rigs relatively to the tractor and actuatable by the operator from his driving position on the tractor. The tractor has, of course, its usual steering wheel or wheels, such preferably being the front wheels, which enable the tractor and implement to be guided in following the general line of the plant rows. In addition, the cultivating rigs can be steered relatively to the tractor so that the cultivating shovels can be shifted quickly in following deviations in the plant rows and in dodging plants offset from the rows. To this end, the forward portion of each rig is pivotally connected with the tractor so that the rig can swing laterally in a steering movement, and the rear portion of each rig is supported on a dirigible supporting wheel with the wheels of all of the rigs cross-connected in steering relation to each other and to the steering controls so that all rigs will be angled simultaneously relatively to the tractor. In this regard, other objects of the invention are to provide an arrangement of steering controls which can be quickly and easily actuated by the operator without distracting his attention from the guidance of the tractor; and to provide a construction wherein the steering connections extending between a rig on one side of a plant row and its companion rig on the opposite side thereof are elevated to clear the plants in the row.

Another object of the invention is to provide a cultivating implement of the above type constructed for cultivating four plant rows; also to so connect the several rigs that they are free to rise and fall independently of each other as the rigs pass over uneven ground, but arranged so that all of the rigs remain substantially in parallelism to each other in swinging to different steering angles relatively to the tractor.

Other objects and advantages of the invention will be apparent in the following description of a preferred embodiment thereof. In the accompanying drawings illustrating such embodiment:

Fig. 1 is a fragmentary side view of the tractor and cultivating implement attachment in assembled relation.

Fig. 2 is a plan view of the same.

Fig. 3 is a transverse sectional view taken on the planes of the lines 3—3 of Figs. 1 and 2 and illustrating the draft hitch between the front ends of the rig beams and the tractor.

Fig. 4 is a longitudinal sectional view taken approximately on the plane of the line 4—4 of Fig. 3 and illustrating in detail the universal joint connection between each rig beam and the transverse draft bar on the tractor.

Fig. 5 is a horizontal sectional view through said draft connection, taken approximately on the plane of the line 5—5 of Fig. 4.

Fig. 6 is a transverse sectional view through the rigs looking rearwardly, as represented by the section plane 6—6 of Fig. 2.

Fig. 7 is a fragmentary horizontal sectional view illustrating the link connections between adjacent rig beams, the same being taken on the plane of the line 7—7 of Fig. 6.

Fig. 8 is a vertical sectional view through the dirigible wheel mounting of one of the cultivator rigs, corresponding to a section on the plane of the line 8—8 of Fig. 7.

Fig. 9 is a vertical sectional view taken on the plane of the line 9—9 of Fig. 7 and showing the adjustable mounting for each cultivator shovel.

Fig. 10 is a horizontal sectional view of the same, taken on the plane of the line 10—10 of Fig. 9; and Fig. 11 is a perspective view of one of the clamping sleeves or yokes in which the shovel shanks are adjustably mounted.

The tractor comprises a suitable main frame structure 15 which is supported at its front end on two steering wheels 16, 16 and at its rear end on two traction wheels 17, 17. The tractor may be of the three wheel type with a single front steering wheel, such being practically the construction shown, since the two wheels 16, 16 are disposed close together and function virtually as a single wheel, or the tractor may be of the four wheel type wherein the two front wheels are spaced relatively far apart, corresponding, for example, to the spacing of the rear wheels.

Such frame structure may be of any appropriate construction, although in the present embodiment we have shown the same as being a part of the housing 15' which encloses the selective speed transmission and differential mechanism of the tractor, and as formed with a V-shaped forwardly extending portion 15'' (Fig. 3) forming a bed for the cylinders of the horizontal internal combustion engine 18. In such embodiment, the usual radiator 19 is mounted on the forward portion of the frame, and a fuel tank 21 extends rearwardly therefrom over the motor 18. As shown in Fig. 2, the front steering wheels 16, 16 are disposed close together to track in the space between the adjacent plant rows, and are mounted on a vertically extending standard 22 (Fig. 1) through which steering movement is transmitted to said wheels through the actuation of steering linkage represented by the gears 23 and drag link 24. The rear end of such drag link has suitable operative connection with a steering shaft 25 supporting the steering wheel 26 in proximity to the operator's position at the rear end of the tractor. Power from the motor 18 is transmitted through a combined clutch and belt pulley indicated at 27 in Fig. 2, and thence through selective speed transmission mechanism and differential gearing, enclosed within the housing 15', to two drive shafts extending outwardly from said housing through tubular housing extensions 28, 28. The outer ends of such extensions are connected with drive chain housings 29 in which the axles 31 of the traction wheels 17 are journaled.

It will be noted that the tubular housing extensions 28 project considerably from the side of the housing 15' to dispose the traction wheels 17 at a considerable distance from the latter housing, the object being to provide clearance space on each side of the tractor between the housing 15' and the adjacent traction wheel 17 of sufficient width to span a plant row, whereby the body of the tractor travels between two plant rows and the traction wheels 17 upon the outer sides of said rows. As shown in Fig. 1, the housing extensions 28 are disposed as high or higher than the main frame 15 of the tractor to give considerable vertical clearance for the plants. It will be understood that power is transmitted from the drive shafts in the housing extensions 28 down to the axles 31 of the traction wheels 17, through drive chains and sprocket wheels, or through gears, enclosed within the downwardly and rearwardly extending housing portions 29. The operator's seat 32 is mounted on a seat spring 33 extending rearwardly from the main housing 15', the seat being disposed for conveniently observing and guiding the path of the cultivator rigs relatively to the plant rows.

The implement structure which is adapted for detachable mounting on the tractor comprises a transverse draft structure preferably consisting of two bars 36 projecting outwardly from the sides of the tractor at a point approximately midway between the front and rear tractor wheels 16 and 17.

Such bars, which are preferably of angle section, have their inner ends detachably secured to the main frame of the tractor, as by bolts 37 extending between downwardly inclined end portions of said bars and the sloping bottom surfaces of the frame portion 15'' (Fig. 3). The outer portions of the transverse draft bars 36 have braced connection with the front portion of the tractor frame through brace rods 38 (Fig. 2), and also have braced connection with the outer portions of the housing extensions 28 through brace rods 39, such brace rods being readily detachable from the tractor to permit convenient detachment of the entire implement structure from the tractor when the latter is to be used for other purposes.

Pivotally connected with the transverse draft frame structure 36 are four pairs of cultivating rigs for cultivating on opposite sides of four plant rows. Such rigs comprise the outer pair of rig beams 41, 41a disposed outwardly beyond the traction wheel 17 at the left hand side of the implement, the rig beams 42, 42a disposed between the left hand traction wheel 17 and the main frame of the tractor, the companion pair of beams 43, 43a between the right hand traction wheel and the side of the frame, and the outer pair of beams 44, 44a disposed outwardly beyond the right hand traction wheel. As best shown in Fig. 2, the front ends of each pair of rig beams are spaced relatively far apart and converge towards each other adjacent to the rear ends of the beams where the cultivating shovels are supported, thereby forming converging guides for receiving and guiding the stalks and upper foliage of the plants back between the sets of cultivator shovels in the travel of the implement.

The front end of each rig beam has connection with the transverse draft bar 36 through a universally pivoted draft connection which permits the rear end of each rig beam to rise and fall and to swing laterally relatively to the transverse draft bar. Referring to Fig. 3, it will be seen that two hitch brackets 46, 46 extend downwardly from the draft bar 36 on each side of the front end of each rig beam. Such brackets, which are preferably of angle section, are bolted to the horizontal and vertical flanges of the associated draft bar 36, as indicated at 47, and at their lower ends the rearwardly extending flanges of said brackets are apertured to receive a transverse pivot bolt 48. Swiveled upon said pivot bolt is a coupling member comprising two sleeves or bosses 51, 52 integrally joined together and extending at right angles to each other. The sleeve portion 51 is mounted on the pivot bolt 48, thereby permitting oscillatory movement of the coupling member about a horizontal axis. A vertically extending pivot bolt 53 passes down through the other sleeve portion 52. Embracing the latter sleeve portion and engaging with the upper and lower ends thereof is a yoke or clevis 54, the arms of which are apertured for receiving the vertically extending pivot bolt 53, whereby the yoke 54 can oscillate laterally about the substantially vertical axis of the bolt 53. Such yoke is provided with a sleeve extension 55 in which the forward end of the rig beam is rigidly secured, each rig beam preferably, although not necessarily, being of tubular stock.

It will be observed that the foregoing hitch connection permits universal movement of each rig beam either vertically or laterally, and that by mounting this hitch connection on the depending draft brackets 46 a relatively low point of hitch is obtained while still providing considerable clearance space below the transverse draft bars 36 and between companion beams of each pair of cultivating rigs, sufficient to avoid injury to relatively high plants.

The shovels or other soil working devices 57 may be mounted in any desired grouping or arrangement on the rig beams which will give the desired cultivation of the rows. Preferably the shovels are disposed back of the position of the traction wheels 17 where they can have considerable lateral movement without striking the wheels, but are nevertheless relatively far forward, either in immediate proximity to or directly in the transverse plane of said wheels, where the shovels are constantly visible to the operator when facing forwardly. In the illustrative arrangement shown, the two outermost rigs 41 and 44 support two cultivator shovels 57, the ends of the rig beams being bent diagonally outwardly to dispose the rear shovels in spaced relation to the adjacent plant row. The two beams 41a and 44a companion thereto support a shovel on the inner side of each plant row and in close proximity thereto. The next beams 42 and 43 preferably support two shovels, with the rear ends of the beams bent diagonally outwardly similarly to the beams 41 and 44 so as to dispose the rear shovels carried by said beams 42 and 43 midway between the plant rows, it being also noted that such rear shovels break up and cultivate the impacted ground traveled over by the traction wheels 17.

Of the two innermost beams 42a and 43a, one of such beams carries a single shovel in proximity to its plant row and the other beam has a diagonally bent rear end for supporting the forward shovel and also a rearward shovel, with the latter cultivating in a line substantially midway between the two innermost plant rows. Referring to one manner of mounting each cultivator shovel on its supporting shank, it will be seen from Fig. 9 that each shovel 57 may be pivotally connected at 58 to a supporting shank 59 in order to permit the shovel to swing rearwardly with respect to the shank, such constituting part of a spring release feature which prevents breakage of the shovel or its supporting parts in the event that the shovel strikes an obstruction in the ground. A rearwardly extending portion of the shovel member has a transverse pivot bolt 61 adjustably mounted thereon, which pivot bolt has pivotal connection with a lower toggle link 62. An upper toggle link 63 has its upper end pivotally connected at 64 to a lug projecting rearwardly from the shank 59, and has its lower end pivotally connected to the lower toggle link at the knuckle pivot 65. A rearwardly extending rod 66 is pivotally connected to the shank 59, as indicated in dotted lines, and supports a compression spring 67 arranged to exert its pressure against the rear side of the link 63, thereby tending to maintain the two toggle links approximately in alinement.

An adjustable stop screw 68 carried by the lower link 62 and adapted to engage the shank 59, normally maintains the two links slightly out of alinement so that when an abnormal pressure is exerted against the cultivator shovel 57 the two toggle links are free to spring backwardly against the pressure of the spring 67, whereby the cultivator shovel can fold backwardly under the shank 59 in clearing the obstruction.

The depth of cultivation of each shovel can be adjusted by shifting the shank 59 vertically in a clamped mounting on the rig beam. In the case of the rear shovels 57, such clamp mounting comprises two clamp members 71 (Fig. 2) engaging over the shank 59 and secured thereto and to the rig beam by clamping bolts 72 extending through the members 71 and through holes in the rig beams. The beam is preferably provided with a plurality of such holes for adjustably receiving the bolts 72 in different shifted positions of the clamping members 71, whereby the rear shovels can be shifted laterally relatively to the plant rows.

The supporting shanks 59 of the front cultivator shovels 57' are also mounted on the rig beams through the instrumentality of clamping devices which permit vertical adjustment of such shovels relatively to the rig beams and also lateral adjustment relatively to the plant rows. Such arrangement of clamping devices is illustrated in Figs. 10 and 11, from which it will be seen that the shank 59 of each front shovel extends upwardly between two clamping arms or lugs 74, 74' projecting laterally from the adjacent rig beam.

Such portions may be formed integral with the beam as shown, or may constitute part of a collar or bracket mounted on the beam. The two arms form the parallel sides of a frame or guideway in which is mounted a split clamping collar 75. The shovel supporting shank 59 extends upwardly through said collar, and at the split side thereof wing portions 76 extend laterally for receiving a transverse clamping bolt 77. The end portions of said bolt engage in horizontal slots 78 in the arms 74, 74'. Releasing the clamping tension on the bolt 77 through unscrewing of the nut 77' thereon permits the shank 59 to be shifted upwardly or downwardly in the clamping collar 75 for effecting depth adjustments of the shovel, and also permits the clamping collar 75 to be shifted inwardly or outwardly between the arms 74, 74' for effecting a lateral adjustment of the shovel relatively to the plant rows. Tightening up the nut 77' simultaneously secures both adjustments by clamping the arms 74, 74' inwardly against the sides of the collar 75 and by contracting the collar about the shank 59. As shown in Fig. 11, the upper and lower ends of the collar 75 are preferably formed with projecting flanges 79 for engaging the upper and lower edges of the arms 74, 74' and guiding the clamping collar in its inward and outward shiftable adjustments between said arms. The arm 74' may be utilized as a point of pivotal attachment for a spacing link extending between adjacent rig beams, and for this purpose is provided with an aperture 81 in its outer end for receiving such spacing link 82.

The other end of said link is similarly pivoted to the corresponding arm 74' projecting from the other rig beam. As shown in Fig. 2, such spacing links are pivotally connected between the beams 41a and 42, 42a and 43a, and between the beams 43 and 44a. Such spacing links maintain the aforesaid pairs of rig beams at an approximately constant spacing, while still permitting all of the beams to swing laterally in the steering movement of the rigs and also permitting the beams to rise and fall independently of each other in the movement of the implement over uneven ground.

Each rig beam is supported by an individual wheel 85 which is preferably disposed directly below the beam and slightly in advance of the shovels carried thereby. Such wheel functions as a gage wheel for limiting the extent to which the rear end of the beam can swing downwardly, depth adjustments of the cultivator shovels being effected by adjusting the shovel shanks 59 upwardly or downwardly relatively to this gauged height of the rig beam. The wheels of all of the rigs are dirigible so that the four pairs of rigs can be steered simultaneously relatively to the tractor. Referring to Fig. 6, it will be seen that each supporting wheel 85 is mounted in a yoke-shaped vertical steering frame comprising two vertical side bars 86, 86' extending upwardly on opposite sides of the tubular rig beam and in spaced relation thereto to permit such yoke or frame to be swiveled through a considerable steering angle without having such bars strike the beam.

The wheel is rotatably mounted on an axle bolt or pivot 87 extending between the arms 86, 86' and, as shown in Fig. 1, the lower ends of said arms are extended rearwardly a short distance to give the wheel 85 a slight castering tendency relative to the vertical swiveling axis of the yoke-shaped frame 86, 86'. As best shown in Fig. 8, the rig beam is provided with a vertical bearing sleeve 88 between the sides of said steering frame, which sleeve may be formed integral with the beam. A pivot pin 89 extends down through said bearing sleeve and projects from the bottom of the beam. An inverted U-shaped bracket 91 has its side portions secured to the vertical bars 86, 86' and has its transverse portion bearing against the lower end of the sleeve bearing 88, the pivot pin 89 projecting downwardly into a bearing aperture in said bracket 91 to afford a lower point of bearing support between the wheel frame and the sleeve bearing on the rig beam. A similar U-shaped bracket or clip 92 is disposed above the bearing sleeve 88 with its side portions rigidly secured to the frame bars 86, 86' and with its transverse portion bearing against the upper end of the bearing sleeve 88. As shown in Fig. 8, the upper end of the pivot pin 89 is preferably headed over in the counterbored upper surface of the bracket 92, as indicated at 93. It will be seen that the foregoing construction establishes a vertical steering axis between each rig beam and the wheel mounting frame 86, 86' of its individual supporting wheel, and such construction provides a long length of bearing axis between the beam and the wheel yoke or frame, thereby preventing relative tilting movement therebetween either fore and aft or laterally.

The upper bearing clip 92 has the steering movement imparted thereto, and accordingly the attachment of such clip to the frame bar 86, 86' is reinforced by providing flanges 94 (Fig. 6) which embrace the edges of said bars.

Such upper bracket or clip has apertured ears for receiving bolts 95 which secure a steering arm 96 to the bracket 92, such steering arm extending rearwardly from between the frame bars 86, 86'. As shown in Fig. 2, the wheel mounting of each rig has such a steering arm extending therefrom, with the exception of the two outermost rigs 41 and 44. A steering link 98 pivotally connects the two steering arms associated with the rigs 41a and 42, such link having downwardly bent ends engaging in holes in the rear ends of the steering arms and transmitting motion from one arm to the other in the steering actuation. A similar motion transmitting link connects the steering arms association with the rigs 42a and 43a, and likewise a third link 98 pivotally connects the two steering arms associated with the rigs 43 and 44a. As shown in Figs. 2 and 7, the steering arms associated with the two innermost rigs 42a and 43a have their front ends extended forwardly beyond the wheel supporting frames 86, 86' and bent inwardly towards each other to form the two foot pedals 97, 97. These pedals are in close proximity to the operator's seat 32 on the tractor so that the operator can conveniently actuate such pedals for steering the cultivating rigs.

It will be evident that the links 98 and 102 serve as means flexibly connecting the rear ends of the cultivator beams together and that forward thrusting movement exerted against the left pedal 97 will operate against the two steering arms 96 and cross connecting link 98 to steer the wheels 85 of the intermediate cultivator units 42a and 43a to the left and, conversely, forward pressure exerted against the right pedal 97 will steer these same wheels to the right. Such steering motion of the two intermediate wheels is transmitted laterally in both directions to the wheels of the other cultivator rigs through link mechanism which we shall now describe.

As shown in Fig. 6, the two side bars 86, 86' of each dirigible wheel supporting frame have their upper ends brought together and secured to each other, as indicated at 99, thereby forming a relatively stiff arm extending upwardly above each frame. The bar 86' is twisted and then bent horizontally to form the forwardly projecting steering arm 101. These forwardly extending steering arms are cross connected between each cooperating pair of rig beams 41—41a, 42—42a etc. by pairs of parallel links 102 which have hooked ends engaging in apertures in the steering arms. The use of two of such links as the connecting means between cooperating pairs of steering arms 101 results in the two arms always remaining substantially in parallelism and prevents the possibility of one of the rigs tracking outwardly away from its companion rig or inwardly towards the same. Thus, the two rigs of each pair remains substantially in parallelism in all steering and straight positions of the rigs.

A corresponding pair of parallel links 102 extends between the associated steering levers 101 associated with each pair of cooperating rigs, such connecting links spanning each plant row between adjacent rigs. As will be noted from Fig. 6, the forwardly extending steering arms 101 are elevated considerably to dispose the cross links 102 at a sufficient height to clear the plants in the plant rows or to prevent injury thereto. Such cross links are preferably disposed as high or higher than the tubular housing extensions 28 of the tractor to clear the plants passing under such housing extensions. The pivotal connections between such links and the steering arms 101 present sufficient flexibility to permit the rig beams to rise and fall relatively to each other in cultivating uneven ground.

By virtue of the foregoing construction movement of the steering mechanism or control pedals 97 is transmitted across the entire series of rigs, from the forwardly extending steering arm of one rig through the parallel links 102 to the same steering arm on the companion rig and from the rearwardly extending steering arm 96 on such rig through the rear steering link 98 to the corresponding arm 96 on the next adjacent rig etc. Thus all of the rigs are caused to swing to the right or left in following deviations in the plant rows, while still being maintained substantially in parallelism and with approximately the same spacing between the groups of cultivator shovels on opposite sides of each plant row.

Attention is directed to the fact that by employing the relatively long rearwardly extending steering arms 96 connected by the rearwardly disposed cross links 98 the steering connections are made to extend around the rear of each traction wheel 17 so that steering motion can be transmitted to the individual rig wheels 85 with the latter disposed approximately in the transverse plane of the traction wheels 17, as shown in Fig. 1. All of this is to the end of disposing the wheels 85 and cultivator shovels 57, 57′ as far forwardly as possible relatively to the tractor in order to reduce the overall length of the implement so that it can be readily turned in a comparatively narrow headland at the end of the field. Such arrangement also disposes the cultivator shovels where the operator can accurately watch the same as to their alinements relatively to the plant rows while still guiding the tractor. By extending the lines of draft of the individual rigs forwardly to the hitch points on the transverse draft bars 36 the draft pull of the rig is transmitted to the tractor at approximately the center of load thereof, which results in an even distribution of pressure or load being maintained on the wheels of the tractor. Moreover, by establishing the draft hitch at this advanced hitch point the long line of draft enables the rig to run steadier and to steer more easily.

For supporting the rigs raised in transport position when the implement is traveling to or from the field, a supporting bar 104 (Fig. 1) is provided on the tractor to extend transversely across the entire series of rigs.

Such bar is mounted on arms 105 preferably extending rearwardly from the transmission chain housings 29 of the tractor. Hooks 106 are linked to the supporting bar 104 at spaced points for effecting supporting engagement with the rigs. When the implement is to be placed in transport condition the rigs are lifted and connected with the hooks 106, the latter either engaging under the rig beams or effecting attachment with the steering linkage or other parts associated with the rigs. By appropriately disconnecting the steering linkage the outer rigs may be raised and supported on the hooks 106 out of operative position, if it should be desired to cultivate only two rows at a time. The entire implement attachment can be readily removed from the tractor by disconnecting the transverse draft bars 36 and brace rods 38 and 39 from the forward portion of the tractor and by dismounting the transverse supporting bar 104 from the rear portion of the tractor.

While we have disclosed what we regard as the preferred embodiment of our invention, it will be understood that such is merely exemplary and that numerous modifications and rearrangements may be made therein without departing from the essence of the invention.

We claim:

1. The combination with a tractor including front and rear wheels, of a cultivator attachment comprising a plurality of independently vertically movable rig beams supporting soil working devices disposed substantially back of the position of said rear traction wheels, steerable individual supporting wheels for said rig beams, means pivotally connecting said beams with said tractor, and means operable to steer said supporting wheels to cause the rig beams to swing laterally relatively to said tractor.

2. The combination with a tractor including front and rear wheels, of a cultivator attachment comprising a plurality of cultivator rig beams disposed intermediate said rear traction wheels and on the outer sides thereof, soil working devices mounted on said beams and disposed substantially in rear of the position of said traction wheels, individual supporting wheels for said rig beams, and means pivotally connecting said beams with said tractor at hitch points disposed near said front wheels.

3. The combination with a tractor including front and rear wheels, of a cultivator attachment comprising a plurality of cultivating rigs having soil working devices disposed substantially in rear of the vertical axial plane of said rear wheels, means pivotally connecting the front portions of said rigs with said tractor at hitch points disposed forwardly of said vertical axial plane, supporting wheels for said rigs, and means operable to angle the latter wheels for steering said cultivating rigs relatively to said tractor.

4. The combination with a tractor including front and rear wheels, of a cultivator attachment comprising a plurality of cultivator rig beams having soil working devices mounted thereon and disposed substantially in rear of the position of said rear traction wheels, means pivotally connecting the forward portions of said rig beams with said tractor at hitch points disposed forwardly of said rear traction wheels, dirigible supporting wheels for each of said rig beams, and steering means operatively connecting the latter wheels for effecting steering movement of said rig beams relatively to said tractor.

5. The combination with a tractor including front and rear wheels, of a cultivator attachment comprising a plurality of cultivator rig beams disposed intermediate said rear traction wheels and on the outer sides thereof, soil working devices mounted on said beams and disposed substantially in proximity to the vertical axial plane of said rear traction wheels, means pivotally connecting the front portions of said beams with said tractor at hitch points disposed forwardly of said rear traction wheels, dirigible supporting wheels for each of said beams, and steering means operatively connecting all of the latter wheels for simultaneously steering all of said rig beams laterally with respect to said tractor.

6. The combination with a tractor comprising a frame, front and rear wheels supporting said frame, a motor operatively connected with said rear wheels to propel the tractor, and an operator's seat adjacent to the rear end of the tractor, of a cultivating implement adapted to be carried and propelled by said tractor comprising a plurality of cultivator rigs having soil working devices disposed in proximity to said rear wheels, means connecting said rigs with said frame in advance of said rear wheels for independent vertical movement and to swing laterally, dirigible supporting wheels for said rigs, and means actuatable by the operator from his seat on the tractor for angling said dirigible wheels to steer said cultivator rigs relatively to the tractor.

7. The combination with a tractor comprising a frame, front steering and rear traction wheels supporting said frame, a motor mounted on said frame and operatively connected with said rear traction wheels to propel the tractor, means operable to steer said front wheels, and an operator's seat mounted on the tractor adjacent to the rear end thereof, of a cultivating implement adapted to be carried and propelled by said tractor comprising a plurality of independently vertically movable cultivator rig beams disposed intermediate said rear traction wheels and on the outer sides thereof, soil working devices mounted on said beams and disposed substantially in rear of said rear traction wheels, a draft bar extending transversely of the tractor intermediate said front and rear wheels, means pivotally connecting the front portions of said rig beams with said draft bar to swing vertically and laterally, individual dirigible wheels supporting the rear portions of said rig beams, and steering means actuatable by the operator from his seat on the tractor for simultaneously angling all of said individual dirigible wheels for steering said rig beams relatively to the tractor.

8. The combination with a tractor comprising a frame, front steering wheels and rear traction wheels supporting said frame, a motor mounted on said frame and operatively connected with said rear traction wheels to propel the tractor, an operator's seat mounted on said frame adjacent to the rear end of the tractor, and steering means adjacent to said seat for steering said front wheels, of a cultivating implement adapted for detachable mounting on said tractor comprising a transverse draft bar adapted to be secured to said tractor in advance of said rear traction wheels, a plurality of cultivator rig beams, means pivotally connecting said beams with said transverse draft bar for lateral swinging movement and for independent vertical movement, soil working devices mounted on said beams substantially in rear of said rear traction wheels, individual supporting wheels for each of said beams pivotally connected therewith for steering movement relatively thereto, foot pedal steering means for said individual wheels mounted adjacent to the operator's seat, and motion transmitting means connecting the latter steering means with said individual supporting wheels for transmitting steering movement thereto, said motion transmitting means permitting independent vertical movement between said rig beams but maintaining the latter substantially parallel in the different angular positions of said beams relatively to the tractor frame.

9. The combination with a tractor including front steering and rear driving wheels, of a cultivator attachment comprising a plurality of cultivator rigs having their forward ends pivotally connected with said tractor at hitch points in advance of said rear wheels, soil working devices mounted on said rigs substantially in rear of the position of said rear wheels, dirigible supporting wheels for said rigs pivotally connected therewith and disposed adjacent to the vertical axial plane of said rear wheels, rearwardly extending steering arms operatively connected with said dirigible wheels, and motion transmitting links extending between said steering arms in rear of said driving wheels.

10. A cultivating implement comprising a frame, front and rear wheels supporting said frame, a motor mounted on said frame and operatively connected with said rear wheels to propel the implement, and a cultivator attachment comprising a plurality of cultivator rigs pivotally connected at their forward ends with said frame at hitch points in advance of said rear wheels, soil working devices mounted on said rigs and disposed substantially in rear of the position of said rear wheels, dirigible supporting wheels for said rigs pivotally connected therewith, steering members operatively connected with said dirigible wheels, and motion transmitting means operatively connecting the steering members of companion pairs of rigs, said motion transmitting means spanning the plant rows between said rigs and being elevated to clear the plants therein.

11. The combination with a frame, front and rear wheels supporting said frame, and a motor mounted on said frame and operatively connected with said rear wheels to drive the same, of a plurality of cultivator rigs pivotally connected at their forward ends with said frame at hitch points in advance of said rear wheels, soil working devices mounted on said rigs and disposed substantially in rear of the position of said rear wheels, dirigible supporting wheels for said rigs pivotally connected therewith, steering members operatively connected with said dirigible wheels, and motion transmitting means operatively connecting the steering members of companion pairs of rigs, said motion transmitting means comprising two substantially parallel links extending between and pivotally connected with companion pairs of steering members, said substantially parallel links transmitting steering motion between said rigs and maintaining the latter substantially parallel in the different angular positions of said rigs relatively to said frame.

12. The combination with a frame, front steering and rear driving wheels supporting the same, a motor mounted on said frame and operatively connected with said rear wheels to drive the same, and steering means connected with said front wheels, of a plurality of cultivator rigs pivotally connected at their forward ends with said frame to swing laterally, soil working devices mounted on said rigs, dirigible supporting wheels for each of said rigs, wheel mounting frames for pivotally connecting said dirigible wheels with their individual rigs, each of said wheel mounting frames comprising spaced bars extending upwardly on opposite sides of their associated rig, an axle member extending between the lower portions of said bars and on which the dirigible supporting wheel is mounted, a pair of vertically spaced transverse supporting members extending between the spaced bars of each wheel mounting frame, a vertically extending bearing portion on each cultivator rig pivotally supported between said transverse supporting members, and motion transmitting linkage operatively connecting the wheel mounting frames of the several rigs.

13. The combination with a tractor comprising a frame, front and rear wheels supporting said frame, a motor operatively connected with said rear wheels to propel the tractor, and means connected with said front wheels for steering the tractor, of a cultivating implement adapted to be carried and propelled by said tractor comprising a plurality of cultivator rig beams disposed intermediate the rear wheels of the tractor and on the outer sides thereof, a draft bar extending transversely of the tractor intermediate said front and rear wheels, means pivotally connecting the front portions of said rig beams with said draft bar for lateral swing movement and independent vertical movement, soil working devices mounted on said rig beams and disposed substantially in rear of the position of said rear tractor wheels, dirigible caster wheels supporting each of said rig beams, forwardly extending steering arms operatively connected with said caster wheels, rearwardly extending steering arms connected with said caster wheels, pairs of parallel links pivotally connecting said forwardly extending steering arms across each plant row between companion rigs of each pair, secondary links pivotally connected between said rearwardly extending steering arms to transmit steering motion from one pair of rigs to the other, and steering pedals actuatable by the driver from his position on the tractor for transmitting steering movement to all of said caster wheels through said steering arms and links.

14. The combination with a tractor including front and rear wheels, of an implement attachment comprising a plurality of beams extending substantially longitudinally of the tractor and movable vertically independently of each other and transversely of the tractor, earth-working devices on said beams disposed adjacent to the position of said rear tractor wheels, hitch means connecting the front portions of said beams with said tractor forward of the position of said rear wheels, gauge wheels connected with the rear portions of said beams, and means flexibly connecting the rear portions of the beams together transversely of the tractor.

15. An agricultural implement comprising, in combination, a tractor having front and rear wheels, and a cultivator attachment comprising a plurality of laterally movable cultivator rigs having soil engaging devices, a transverse draft bar extending laterally of the tractor and detachably secured to the tractor, supporting wheel means for the rigs and pivotally connected therewith to swing about a generally vertical axis and means connecting the cultivator rigs to the draft bar.

16. An agricultural implement comprising, in combination, a tractor having front and rear wheels, and a cultivator attachment comprising a plurality of laterally movable cultivator beams, soil engaging devices secured thereto, individual supporting wheels pivoted to said beams to swing about a generally vertical axis to provide support for the beams when the latter are shifted laterally relative to the ground, a transverse draft bar extending laterally of the tractor beyond the wheels and detachably secured to the tractor near the front wheels, and means connecting the cultivator beams to the draft bar so that the rigs extend rearwardly.

17. The combination with a tractor including front and rear wheels, of a cultivator attachment comprising a transverse draft bar projecting laterally from each side of the tractor near the front wheels and detachably connected therewith, laterally spaced separately formed draft members on the bar, laterally movable cultivator rigs, means pivotally connecting said cultivator rigs with the lower portions of said draft members for lateral swinging movement and independent vertical movement, brace means connecting the outer ends of said draft bar with the tractor, individual supporting wheels for the rigs pivotally connected therewith to swing about a generally vertical axis and soil working devices mounted on said rigs.

18. An agricultural implement comprising, in combination, a tractor having front and rear wheels, and a cultivator attachment comprising a plurality of laterally movable cultivator beams, soil engaging devices secured thereto, individual supporting wheels pivoted to said beams to swing about a generally vertical axis to provide support for the beams when the latter are shifted laterally relative to the ground, a transverse draft bar extending laterally of the tractor and detachably secured thereto, and means connecting the cultivator beams to the draft bar so that the rigs extend rearwardly.

19. An agricultural implement comprising, in combination, a tractor having front and rear wheels, and a cultivator attachment comprising a plurality of laterally movable cultivator beams, soil engaging devices secured thereto, individual supporting wheels pivoted to said beams to swing about a generally vertical axis to provide support for the beams when the latter are shifted laterally relative to the ground, a transverse draft bar extending laterally of the tractor and detachably secured to the tractor near the front wheels, and means connecting the cultivator beams to the draft bar so that the rigs extend rearwardly.

In witness whereof, we hereunto subscribe our names this 5th day of March, 1929.

CHARLES H. WHITE.
FRANK T. COURT.